United States Patent Office 3,798,207
Patented Mar. 19, 1974

3,798,207
METHOD OF PURIFYING α-L-ASPARTYL-L-PHENYLALANINE METHYL ESTER
Yasuo Ariyoshi, Yokohama, and Yohko Koguchi and Naotake Sato, Tokyo, Japan, assignors to Ajinomoto Co., Inc., Tokyo, Japan
No Drawing. Filed Oct. 26, 1971, Ser. No. 192,671
Claims priority, application Japan, Oct. 26, 1970, 45/94,076
Int. Cl. C07c *103/52*
U.S. Cl. 260—112.5          8 Claims

ABSTRACT OF THE DISCLOSURE

α-L-aspartyl-L-phenylalanine methyl ester, a known artificial sweetener, is separated from the bitter tasting β-isomer and other impurities by converting it to the hydrochloride or hydrobromide which is practically insoluble in aqueous solvents 0.3 to 6.0 normal with respect to the hydrohalide.

---

This invention relates to the purification of α-L-aspartyl-L-phenylalanine methyl ester, hereinafter referred to as α-APM.

The ester is a known artificial sweetener having a taste closely similar to that of cane sugar (U.S. Pat. No. 3,492,131). It is readily prepared from the methyl ester of phenylalanine by reaction with aspartic anhydride, but the reaction product contains enough of the somewhat bitter tasting β-isomer to require purification.

α-APM sufficiently free from the β-isomer to avoid the bitter taste of the latter has been prepared from the crude synthetic product by repeated recrystallization from water. However, the solubilities of the compounds are not sufficiently different to make the method practical unless the amount of the β-isomer initially present is small. Moreover, α-APM, like other α-bonded dipeptide esters, tends to be converted to the corresponding diketopiperazine derivative during repeated recrystallization, and the yield of the desired product is reduced. No organic solvent is known to be more useful for recrystallization than water.

Other impurities, including unreacted starting materials and by-products are associated with α-APM when the latter is prepared by other methods, and the recovery of adequately pure α-APM from such other reaction products has not been possible prior to this invention.

It has now been found that α-APM forms salts with hydrogen chloride and hydrogen bromide which are much less soluble than the corresponding salts of the β-isomer or of other impurities associated with α-APM when prepared by any method known at this time, such as the reactions of the methyl ester of phenylalanine with aspartic anhydride and its derivatives, for example, N-protected aspartic anhydride and acid salts of aspartic anhydride.

The precipitation of the α-APM salt is not affected by the presence of water-soluble or water-miscible inert solvents such as methanol, ethanol, propanol, ethylene glycol, isobutylene glycol, acetone, methyl ethyl ketone, diethyl ketone, tetrahydrofuran, dioxane, acetonitrile, dimethylformamide, dimethylsulfoxide, or γ-butyrolactone.

α-APM is precipitated in the form of its salts from its aqueous solutions in the presence of the hydrogen halides. The required minimum concentration of the hydrogen halide varies with the temperature and the amount and kind of impurities. Generally, the aqueous system should be more than 0.3, preferably more than 0.5 normal with respect to hydrochloric or hydrobromic acid. Crystals of free α-APM may be compatible with an aqueous solution of the hydrogen halide which is less than 0.3 N. When a solution having a concentration of hydrogen halide greater than 6 N is employed, the α-APM tends to decompose.

At a hydrogen halide concentration of 0.3 to 6.0 N, the β-isomer and other impurities frequently accompanying α-APM, such as aspartic acid, methyl ester of phenylalanine, aspartylaspartic acid, α- and β-aspartyl phenylalanine, inorganic salts, and organic coloring matter of uncertain composition remain as solutes in the aqueous hydrogen halide solution because the solubilities of these impurities are at least twice the solubility of α-APM in aqueous solvents containing the above-mentioned concentrations of hydrogen halides. Surprisingly, the solubility of the β-isomer is more than 90 times that of α-APM.

The amount of hydrogen halide is not critical, but at least one mole per mole of α-APM is needed for a good yield. Although the most suitable amount of hydrogen halide depends on the concentration of the α-APM, great improvement is possible by raising the mole ratio to 1.3:1, preferably to more than 2:1, because the solubility of the α-APM salt decreases with the amount of free hydrogen halide present in the aqueous medium.

The salts are also formed at elevated temperature, but the decomposition of α-APM to aspartylphenylalanine, aspartic acid, phenylalanine, and the like is accelerated by heating. Temperatures above 70° C. should not normally be selected, and the decomposition is practically suppressed at temperatures of 50° C. or less. The solubility of the salts in aqueous media increases gradually with temperature. Therefore, it is preferred to precipitate the salts from the aqueous system at the lowest temperature that can be reached conveniently. It is usually more economical to precipitate hydrohalides at temperatures of 10° C. or less. Full precipitation of the salt may take several hours to two days at the preferred low temperature.

The salts are separated from the aqueous medium by filtering, decanting, or centrifuging. Pure α-APM is precipitated when aqueous solutions of the salts are adjusted to pH 4.0 to 5.5 with an alkali metal carbonate or bicarbonate, or silver oxide or carbonate, or with an organic base such as triethylamine, pyridine, picoline, or quinoline, or by treatment with an anion exchange resin.

The following examples further illustrate the present invention.

EXAMPLE 1

5.0 g. α-APM were dissolved in 120 ml. 1 N-hydrochloric acid at room temperature. After the solution was allowed to stand for 1 hour, the prismatic crystals precipitated were filtered off and weighed 2.0 g. M.P. 127–128° C. (partly melted at 103° C.).

*Elementary analysis.*—Found (percent): C, 46.10; H. 6.44; N, 7.70; Cl, 9.73. Calcd. for

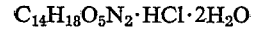

$$C_{14}H_{18}O_5N_2 \cdot HCl \cdot 2H_2O$$

(percent): C, 45.84; H, 6.32; N, 7.64; Cl, 9.67.

The crystals were thus identified as α-APM·hydrochloride·dihydrate (α-APM·HCl) by their elementary analysis, and also by their infrared spectrum.

EXAMPLE 2

5.0 g. α-APM and 5.0 g. β-L-aspartyl-L-phenylalanine methyl ester (β-APM) were dissolved in 50 ml. 1 N-hydrochloric acid at room temperature, and newly formed prismatic crystals precipitated immediately. After the slurry was aged in a refrigerator overnight, the crystals were collected by filtration and weighed 4.8 g. The infrared spectrum and the melting point of the crystals were identical with the corresponding properties of the α-APM·HCl obtained in Example 1. When subjected to paper electrophoresis in aqueous acetic acid of pH 2.77 at 25 v./cm. using Ninhydrin for development, they were found to be pure α-APM·HCl free from β-APM.

3.5 grams of the crystals thus obtained were added to 50 ml. water, and the resulting solution was adjusted to pH 5.0 with sodium bicarbonate. The needle-shaped crystals precipitated thereby were filtered off and weighed 2.5 g. M.P. 235–236° C. The needles were identified as pure α-APM by paper electrophoresis and infrared spectrum.

EXAMPLES 3–6

Mixtures of 5.0 g. α-APM and 5.0 g. β-APM were treated similarly as in Example 2 under the respective conditions listed in Table 1. The results are summarized in Table 1.

TABLE 1

| Example number | Hydrochloric acid concentration | Aging Ml. | Aging °C. | Aging Hours | Yield of α-APM·HCl (g.) |
|---|---|---|---|---|---|
| 3 | 0.6 N | 100 | 5 | 18 | 4.8 |
| 4 | 1.0 N | 100 | 25 | 18 | 2.8 |
| 5 | 2.0 N | 50 | 25 | 0.5 | 4.9 |
| 6 | 2.0 N | 100 | 25 | 18 | 2.9 |

EXAMPLE 7

5.0 g. α-APM, 0.2 g. aspartic acid, 0.2 g. methyl L-phenylalaninate hydrochloride, and 0.2 g. sodium chloride were dissolved in 50 ml. 1 N-hydrochloric acid. The solution was then kept in a refrigerator overnight. The prismatic crystals precipitated were filtered off and weighed 5.0 g. The infrared spectrum and the melting point identified the crystals as α-APM·HCl. The compound was found to be pure by paper electrophoresis.

EXAMPLE 8

5.0 g. α-APM and 5.0 g. β-APM were dissolved in a mixture of 50 ml. 1 N-hydrochloric acid and 20 ml. methanol. The solution was kept in a refrigerator overnight. The prismatic crystals precipitated were collected by filtration and weighed 4.9 g. The infrared spectrum and the melting point of the crystals were identical with the known properties of α-APM·HCl. They were found to be free from β-APM by paper electrophoresis.

EXAMPLE 9

5.0 g. each of α- and β-APM were dissolved in a mixture of 50 ml. 1 N-hydrochloric acid and 10 ml. acetone. The solution was treated as in Example 8. 4.5 g. pure α-APM·HCl were obtained.

EXAMPLE 10

21.6 g. L-phenylalanine methyl ester hydrochloride was dissolved in 125 ml. water and then neutralized with 9.2 g. sodium bicarbonate. The L-phenylalanine methyl ester was extracted with 100 ml. ethylene dichloride. The aqueous layer was then shaken with 90 ml. fresh ethylene dichloride.

The two extracts were combined and 3.8 g. L-aspartic anhydride hydrochloride was added. The reaction mixture was stirred for 30 minutes at −20° C., then mixed with 165 ml. water containing 1.4 g. sodium carbonate and shaken vigorously. The aqueous layer was washed twice with 150 ml. ethylene dichloride and then adjusted to pH 5.0 and almost evaporated in a vacuum.

The residue was mixed with 8 ml. 35% hydrochloric acid, bringing the volume of the solution so obtained to 35 ml. The solution was kept in a refrigerator overnight. The prismatic crystals precipitated were collected by filtration and dissolved in 50 ml. water. The solution was adjusted to pH 5.0 with sodium carbonate and kept in a refrigerator overnight. The needle-shaped crystals formed were filtered off and weighed 3.1 g. They were identified as pure α-APM by their infrared spectrum, melting point, and elementary analysis. They were found to be free from β-APM and other impurities by paper electrophoresis.

EXAMPLE 11

5.0 g. α-APM was dissolved in 100 ml. 1 N-hydrobromic acid, and the solution was kept in a refrigerator overnight.

The prismatic crystals formed were collected by filtration and weighed 4.3 g. M.P. 155° C. (decomp.).

*Elementary analysis.*—Found (percent): C, 41.13; H, 5.76; N, 6.85; Br, 19.39. Calcd. for $$C_{14}H_{18}O_5N_2 \cdot HBr \cdot 2H_2O$$

(percent): C, 40.88; H, 5.64; N, 6.81; Br, 19.43. N, 6.81; Br, 19.43.

The crystals were also identified as α-APM·hydrobromide·dihydrate by their infrared spectrum.

EXAMPLE 12

5.0 g. each of α- and β-APM were dissolved in 50 ml. 1 N-hydrobromic acid, and the solution was stored in a refrigerator overnight.

The prismatic crystals formed were collected by filtration and weighed 5.2 g. The melting point and infrared spectrum of the crystals were identical with the data obtained in Example 11. The crystals were free from the β-isomer as determined by paper electrophoresis.

5.0 g. crystals were dissolved in 50 ml. water, and the solution was adjusted to pH 5.0 with sodium bicarbonate and then kept in a refrigerator overnight. The needle-shaped crystals formed were filtered off and weighed 3.2 g. M.P. 235–236° C. The crystals were identified as pure α-APM by their infrared spectrum, and were further identified by paper electrophoresis.

EXAMPLE 13

For comparison purposes, 5.0 g. β-APM were dissolved in a mixture of 207 ml. 35% hydrochloric acid and 50 ml. water. The solution was kept in a refrigerator overnight, but no crystals precipitated.

The solution was evaporated in a vacuum, and the residue was mixed with 50 ml. benzene, and the benzene suspension was evaporated in a vacuum. This procedure was repeated four more times, yielding an amorphous solid residue. The solid material was very hygroscopic, and melted at 60–73° C.

*Elementary analysis.*—Found (percent): N, 7.75. Calcd. for $C_{14}H_{18}O_5N_2 \cdot HCl \cdot 2H_2O$ (percent): N, 7.64.

The compound was also identified as β-APM·hydrochloride·dihydrate by its infrared spectrum and N.M.R. spectrum.

Its solubility was found to be more than 270 g./100 g. 1 N-hydrochloric acid at 30° C.

It is preferred and usually least costly to recover the purified α-L-aspartyl-L-phenylalanine methyl ester from its precipitated hydrogen halide salt by dissolving the salt in an aqueous liquid, and holding the pH value of the resulting solution at approximately 4.0 to 5.5 until the purified ester is precipitated in crystalline form and may be separated from the aqueous liquid by filtering or the like. However, numerous other methods for decomposing hydrogen halide salts for recovery of their cationic moiety are known, and may be resorted to by those skilled in the art under suitable conditions.

Other modifications and variations of the present invention are obviously possible in the light of the above teachings. It is therefore to be understood that, within the scope of the appended claims, the invention may be practiced otherwise than as specifically described.

What is claimed is:

1. A method of purifying α-L-aspartyl-L-phenylalanine methyl ester contaminated with the corresponding β-isomer which comprises:
    (a) contacting said contaminated ester with a solution of a hydrogen halide selected from the group consisting of hydrogen bromide in an aqueous medium until a hydrogen halide salt of said ester is precipitated from said solution,
        (1) said solution being at least 0.3 normal with respect to said hydrogen halide;
    (b) separating the precipitated salt from the remainder of said solution; and (c) recovering purified α-L-aspartyl-L-phenylalanine methyl ester from the separated salt.

2. A method as set forth in claim 1, wherein said solution is not more than 6.0 normal with respect to said hydrogen halide.

3. A method as set forth in claim 2, wherein said solution has a temperature not exceeding 70° C.

4. A method as set forth in claim 2, wherein said solution has a temperature not exceeding 50° C.

5. A method as set forth in claim 4, wherein the amount of said hydrogen halide in said solution is at least one mole per mole of said contaminated ester.

6. A method as set forth in claim 4, wherein said amount is at least two moles per mole of said contaminated ester.

7. A method as set forth in claim 1, wherein said purified ester is recovered from the separated salt by dissolving said salt in an aqueous liquid, holding the pH value of the resulting solution of said salt at approximately 4.0 to 5.5 until said purified ester is precipitated in crystalline form, and separating the purified, crystalline ester from said aqueous liquid.

8. A method as set forth in claim 7, wherein said contaminated ester is dissolved in said medium prior to the precipitating of said hydrogen halide salt.

References Cited
UNITED STATES PATENTS

| | | | |
|---|---|---|---|
| 3,678,026 | 7/1972 | Ariyoshi et al. | 260—112.5 |
| 3,642,491 | 2/1972 | Schlatter | 260—112.5 |
| 3,492,131 | 1/1970 | Schlatter | 260—112.5 |

LEWIS GOTTS, Primary Examiner

R. J. SUYAT, Assistant Examiner

UNITED STATES PATENT AND TRADEMARK OFFICE
CERTIFICATE OF CORRECTION

PATENT NO. : 3,798,207
DATED : March 19, 1974
INVENTOR(S) : Yasuo Ariyoshi et al It is certified that error appears in the above-identified patent and that said Letters Patent are hereby corrected as shown below:

Column 4, line 69, before "hydrogen bromide" insert --hydrogen chloride and --.

Signed and Sealed this

Eighth Day of January 1980

[SEAL]

Attest:

SIDNEY A. DIAMOND

Attesting Officer

Commissioner of Patents and Trademarks